US008574451B2

(12) United States Patent
Hulse et al.

(10) Patent No.: US 8,574,451 B2
(45) Date of Patent: *Nov. 5, 2013

(54) TRANS-CHLORO-3,3,3-TRIFLUOROPROPENE FOR USE IN CHILLER APPLICATIONS

(75) Inventors: Ryan Hulse, Getzville, NY (US); Rajiv Ratna Singh, Getzville, NY (US); Mark W. Spatz, East Amherst, NY (US)

(73) Assignee: Honeywell International Inc., Morristown, NJ (US)

( * ) Notice: Subject to any disclaimer, the term of this patent is extended or adjusted under 35 U.S.C. 154(b) by 227 days.

This patent is subject to a terminal disclaimer.

(21) Appl. No.: 12/637,562

(22) Filed: Dec. 14, 2009

(65) Prior Publication Data

US 2010/0154444 A1 Jun. 24, 2010
US 2012/0240606 A9 Sep. 27, 2012

Related U.S. Application Data

(63) Continuation-in-part of application No. 12/351,807, filed on Jan. 9, 2009, and a continuation-in-part of application No. 11/475,605, filed on Jun. 26, 2006.

(60) Provisional application No. 61/138,245, filed on Dec. 17, 2008, provisional application No. 61/020,390, filed on Jan. 10, 2008, provisional application No. 60/693,853, filed on Jun. 24, 5.

(51) Int. Cl.
*C09K 5/04* (2006.01)

(52) U.S. Cl.
USPC .......................................................... 252/67

(58) Field of Classification Search
USPC .......................................................... 252/67
See application file for complete search history.

(56) References Cited

U.S. PATENT DOCUMENTS

| | | | |
|---|---|---|---|
| 2,773,722 A | 12/1956 | Abplanalp | |
| 2,846,458 A | 8/1958 | Haluska | |
| 2,834,748 A | 10/1958 | Bailey et al. | |
| 2,889,379 A | 6/1959 | Ruh et al. | |
| 2,917,480 A | 12/1959 | Bailey et al. | |
| 2,931,840 A | 4/1960 | Marquis | |
| 2,996,555 A | 8/1961 | Rausch | |
| 3,085,918 A | 4/1963 | Sherliker et al. | |
| 3,472,826 A | 10/1969 | Potts et al. | |
| 3,659,023 A | 4/1972 | Regan | |
| 3,723,318 A | 3/1973 | Butler et al. | |
| 3,884,828 A | 5/1975 | Butler et al. | |
| 4,465,786 A | 8/1984 | Zimmer et al. | |
| 4,650,914 A | 3/1987 | Woodard et al. | |
| 4,755,316 A | 7/1988 | Magid et al. | |
| 4,788,352 A | 11/1988 | Smutny | |
| 4,798,818 A | 1/1989 | Baizer et al. | |
| 4,900,874 A | 2/1990 | Ihara et al. | |
| 4,944,890 A | 7/1990 | Deeb et al. | |
| 4,945,119 A | 7/1990 | Smits et al. | |
| 4,971,712 A | 11/1990 | Gorski et al. | |
| 4,975,212 A | 12/1990 | Thomas et al. | |
| 5,008,028 A | 4/1991 | Jolley et al. | |
| 5,053,155 A | 10/1991 | Mahler et al. | |
| 5,137,932 A | 8/1992 | Behme et al. | |
| 5,155,082 A | 10/1992 | Tung et al. | |
| 5,174,083 A | 12/1992 | Mussell | |
| 5,250,208 A | 10/1993 | Merchant et al. | |
| 5,254,280 A | 10/1993 | Thomas et al. | |
| 5,370,812 A | 12/1994 | Brown | |
| 5,532,419 A | 7/1996 | Van Der Puy et al. | |
| 5,545,777 A | 8/1996 | Morikawa et al. | |
| 5,574,192 A | 11/1996 | VanDerPuy et al. | |
| 5,578,137 A | 11/1996 | Shealy et al. | |
| 5,616,275 A | 4/1997 | Chisolm et al. | |
| 5,674,451 A | 10/1997 | Nimitz et al. | |
| 5,679,875 A | 10/1997 | Aoyamaeta et al. | |
| 5,710,352 A | 1/1998 | Tung | |
| 5,714,083 A | 2/1998 | Turner et al. | |
| 5,728,904 A | 3/1998 | Van Der Puy et al. | |
| 5,736,063 A | 4/1998 | Richard et al. | |
| 5,744,052 A | 4/1998 | Bivens | |
| 5,788,886 A | 8/1998 | Minor et al. | |
| 5,792,383 A | 8/1998 | Reyes-Gavilan et al. | |
| 5,866,030 A | 2/1999 | Reyes-Gavilan et al. | |
| 5,900,185 A | 5/1999 | Tapscott | |
| 5,969,198 A | 10/1999 | Thenappan et al. | |
| 5,986,151 A | 11/1999 | Van Der Puy | |
| 6,023,004 A | 2/2000 | Thenappan et al. | |
| 6,031,141 A | 2/2000 | Mallikarjuna et al. | |
| 6,041,621 A | 3/2000 | Olszewski et al. | |
| 6,076,372 A | 6/2000 | Acharya et al. | |

(Continued)

FOREIGN PATENT DOCUMENTS

DE 950876 2/1964
EP 398147 11/1990

(Continued)

OTHER PUBLICATIONS

Saunders and Frisch, "Polyurethanes Chemistry & Technology," vol. XVI, Part I and Part II Technology, John Wiley and Sons, New York, NY (1962), pp. 193 to 201 and 219 to 223.
Downing, Ralph C., "Fluorcarbon Refrigerants Handbook," Prentice Hall, Chapter 3 (1988), pp. 17 to 34.
Morrissey, C.J.: Nearly Azeotropic Mixtures to Replace Refrigerant 12. In: National Aeronautics and Space Administration Contract No. NAS 7-918, Aug. 1992, NASA Tech Brief, vol. 16, No. 8, item #122.
Henne et al., "Fluorinated Derivatives of Propane and Propylene VI," J. Am. Chem. Soc., 68, 496-497 (1946).
Tarrant, et al., "Free Radical Additions Involving Fluorine Compounds. IV. The Addition of Dibromodifluoromethane to Some Fluoroolefins," J. Am. Chem Soc., 77, 2783-2786 (1955).
Kimura, et al., "Poly(ethylene glycols) and poly(ethylene glycol)-grafted copolymers are extraordinary catalysts for dehydrohalogenation under two-phase and three-phase conditions," J. Org. Chem., 48, 195-0198 (1983).
Database WPI, Section CH, Week 199812, Derwent Publications Ltd., London, GB; AN 1998-126109, XP002324078.

(Continued)

*Primary Examiner* — John Hardee
(74) *Attorney, Agent, or Firm* — Colleen D. Szuch

(57) ABSTRACT

The present invention relates to refrigerant compositions containing trans-chloro-3,3,3-trifluoropropene (1233zd(E)) useful for chiller applications and processes using 1233zd(E).

11 Claims, No Drawings

(56) References Cited

U.S. PATENT DOCUMENTS

| | | |
|---|---|---|
| 6,111,150 A | 8/2000 | Sakyu et al. |
| 6,124,510 A | 9/2000 | Elsheikh et al. |
| 6,258,292 B1 | 7/2001 | Turner et al. |
| 6,274,779 B1 | 8/2001 | Merkel et al. |
| 6,300,378 B1 | 10/2001 | Tapscott |
| 6,327,866 B1 | 12/2001 | Novak et al. |
| 6,369,284 B1 | 4/2002 | Nappa et al. |
| 6,516,837 B2 | 2/2003 | Thomas et al. |
| 6,548,719 B1 | 4/2003 | Nair et al. |
| 6,809,226 B1 | 10/2004 | Pennetreau et al. |
| 6,858,571 B2 | 2/2005 | Pham et al. |
| 6,958,424 B1 | 10/2005 | Nair et al. |
| 6,972,271 B2 | 12/2005 | Thomas et al. |
| 7,074,751 B2 | 7/2006 | Singh et al. |
| 7,098,176 B2 | 8/2006 | Singh et al. |
| 7,230,146 B2 | 6/2007 | Merkel et al. |
| 7,248,809 B2 | 7/2007 | Kim et al. |
| 7,279,451 B2 | 10/2007 | Singh et al. |
| 7,442,321 B1 | 10/2008 | Chen et al. |
| 7,534,366 B2 | 5/2009 | Singh et al. |
| 7,563,384 B2 | 7/2009 | Thomas et al. |
| 7,605,117 B2 | 10/2009 | Wilson et al. |
| 7,622,435 B2 | 11/2009 | Wilson et al. |
| 7,629,306 B2 | 12/2009 | Shankland et al. |
| 7,833,433 B2 | 11/2010 | Singh et al. |
| 2003/0042463 A1 | 3/2003 | Arman et al. |
| 2003/0127115 A1 | 7/2003 | Thomas et al. |
| 2004/0089839 A1 | 5/2004 | Thomas et al. |
| 2004/0119047 A1 | 6/2004 | Singh et al. |
| 2004/0127383 A1 | 7/2004 | Pham et al. |
| 2004/0217322 A1 | 11/2004 | Sharma et al. |
| 2004/0256594 A1 | 12/2004 | Singh et al. |
| 2005/0020862 A1 | 1/2005 | Tung et al. |
| 2005/0054741 A1 | 3/2005 | Zipfel et al. |
| 2005/0090698 A1 | 4/2005 | Merkel et al. |
| 2005/0107246 A1 | 5/2005 | Thomas et al. |
| 2005/0171391 A1 | 8/2005 | Janssens et al. |
| 2006/0043331 A1 | 3/2006 | Shankland et al. |
| 2006/0142173 A1 | 6/2006 | Johnson et al. |
| 2006/0243944 A1 | 11/2006 | Minor et al. |
| 2007/0007488 A1 | 1/2007 | Singh et al. |
| 2007/0010592 A1 | 1/2007 | Bowman et al. |
| 2007/0069175 A1 | 3/2007 | Thomas et al. |
| 2007/0098646 A1 | 5/2007 | Nappa et al. |
| 2007/0100010 A1 | 5/2007 | Creazzo et al. |
| 2007/0108403 A1 | 5/2007 | Sievert et al. |
| 2007/0109748 A1 | 9/2007 | Bowman et al. |
| 2007/0284555 A1 | 12/2007 | Leck et al. |
| 2007/0290177 A1 | 12/2007 | Singh et al. |
| 2008/0230738 A1 | 9/2008 | Minor et al. |
| 2009/0253820 A1 | 10/2009 | Bowman et al. |

FOREIGN PATENT DOCUMENTS

| | | |
|---|---|---|
| EP | 522639 | 1/1993 |
| EP | 582451 | 2/1994 |
| EP | 644173 | 3/1995 |
| EP | 974571 | 1/2000 |
| EP | 1055439 | 11/2000 |
| EP | 1167894 | 2/2002 |
| EP | 1191080 | 3/2002 |
| JP | 2004-110388 | 4/1992 |
| JP | 10007604 | 1/1998 |
| JP | 11140002 | 5/1999 |
| JP | 2000169404 | 6/2000 |
| RU | 2073058 | 10/1997 |
| WO | WO 95/04021 | 2/1995 |
| WO | WO 96/01797 | 1/1996 |
| WO | WO 98/33755 | 8/1998 |
| WO | WO 00/24815 | 4/2000 |
| WO | WO 03/064508 | 8/2003 |
| WO | WO 2004/037752 | 5/2004 |
| WO | WO 2004/037913 | 5/2004 |
| WO | WO 2005/012212 | 2/2005 |
| WO | WO 2005/042451 | 5/2005 |
| WO | WO 2005/103187 | 11/2005 |
| WO | WO 2005/103188 | 11/2005 |
| WO | WO 2005/105947 | 11/2005 |
| WO | WO 2007/002625 | 1/2007 |
| WO | WO 2007/109748 | 9/2007 |
| WO | WO 2009/114397 | 9/2009 |
| WO | WO 2009/114398 A1 * | 9/2009 |

OTHER PUBLICATIONS

Database WPI, Section CH, Week 199931, Derwent Publications Ltd., London, GB; AN 1999-367023, XP002324079.

PCT Search Report Form PCT/ISA/206 for PCT/US2004/035131 Filed Oct. 25, 2004.

Zhurani Organicheskoi Khimii, 28(4), 672-80, (1992).

Kunshenko, B.V. et al., "Reaction of Organic Compounds with SF4-HF-Halogenating System VII. Reactions of Olefins with the SF4-HF-Clx(Br2) System," Odessa Polytechnical Institute, Institute of Organic Chemistry, Academy of Sciences of the Ukraine, Kiev., Translated from Zhurani Organicheskoi Khimii, 28(4), 672-80 (1982), Original artical submitted Aug. 24, 1989. XP002344564.

* cited by examiner

US 8,574,451 B2

TRANS-CHLORO-3,3,3-TRIFLUOROPROPENE FOR USE IN CHILLER APPLICATIONS

CROSS REFERENCE TO RELATED APPLICATIONS

The present invention claims the priority benefit of U.S. Provisional Application No. 61/138,245, filed Dec. 17, 2008, and is a continuation-in-part of U.S. application Ser. No. 12/351,807, filed Jan. 9, 2009, (currently pending) which claims the priority benefit of U.S. Provisional Application No. 61/020,390, filed Jan. 10, 2008. The present invention is also a continuation-in-part of U.S. application Ser. No. 11/475,605, filed Jun. 26, 2006 (currently pending) which claims the priority benefit of U.S. Provisional Application No. 60/693,853, filed on Jun. 24, 2005.

FIELD OF THE INVENTION

The present invention relates to compositions having utility in numerous applications, including chiller applications, and to methods and systems utilizing such compositions. In particular, the present invention is directed to methods of using refrigerant compositions containing trans-chloro-3,3,3-trifluoropropene (1233zd(E)) in chiller applications.

BACKGROUND OF THE INVENTION

Fluorocarbon-based fluids are widely used in refrigeration, heat pump, air conditioning, and chiller applications. Fluorocarbons are used to transfer heat from an undesired location to a location where the heat is wanted. A purpose of refrigeration or air conditioning systems is to remove energy from a cool region. A purpose of a heat pump is to add energy to a hot region.

Physical properties of the refrigerant such as density, vapor pressure, and heat of vaporization help to determine what application is best for the refrigerant. Safety and environmental impacts of the refrigerant should also be considered. For example, the flammability, ozone depletion potential (ODP), and global warming potential (GWP) should be considered.

Mixtures of refrigerants are commonly used to match the desired physical properties of the refrigeration or heat pump system. Centrifugal chillers, however, can only accommodate pure or azeotropic refrigerants since non-azeotropic mixtures will separate in pool boiling evaporators decreasing the system performance.

An important factor to consider for a new refrigerant for use in a chiller is the COP (the ratio between the cooling capacity in KW to the energy consumed by the whole chiller in KW). The COP allows effective comparison of different refrigerants in a chiller system. The higher the COP, the more efficient the system is to convert energy into the desired cooling.

BRIEF SUMMARY OF THE INVENTION

Aspects of the present invention are directed to compositions having utility in chiller systems, and to methods and systems utilizing such compositions.

The invention provides compositions containing at least trans1-chloro-3,3,3-trifluoropropene (1233zd(E)). Compositions containing the compound 1233zd(E) are environmentally suitable replacements for chlorofluorocarbons in refrigeration applications such as chillers.

DETAILED DESCRIPTION OF THE INVENTION

It was discovered that 1233zd(E) (trans1-chloro-3,3,3-trifluoropropene) is particularly useful as a refrigerant in chiller applications. Due to the extremely short atmospheric lifetime of the 1233zd(E), the ozone depletion potential and the global warming potential of these molecules is significantly smaller than that of currently used refrigerant R-123. Further it was discovered that of the low ODP molecules currently available, 1233zd(E) has the highest COP of all the compounds that are not scheduled for phase-out in the Montreal Protocol.

It was discovered that the refrigerant 1233zd(E) performed better than the cis-isomer 1233zd(Z) in chiller applications. 1233zd(E) has a much higher capacity therefore a smaller system could be used to deliver the same capacity as either a 1233zd(Z) or R123 systems. The COP of 1233zd(E) is slightly lower than 1233zd(Z) and on par with R123.

The composition useful in the present invention comprises trans-1-chloro-3,3,3-trifluoropropene (HCFC-1233zd(E)). Although it is contemplated that the compositions of the present invention may include 1233zd(E) in widely ranging amounts, generally the refrigerant compositions of the present invention comprise 1233zd(E), in an amount that is at least about 50% by weight, and more particularly at least about 70% by weight, of the total composition. In many embodiments, the heat transfer compositions of the present invention comprise 100% 1233zd(E).

The 1233zd(E) used in the present invention should be used in sufficiently high purity so as to avoid the introduction of adverse influences upon the cooling or heating properties of the system.

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 30 to about 50 percent by weight of the composition. Furthermore, the present compositions may also include a compatibilizer, such as propane and pentane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention. Nitromethane may also be added as a stabilizer.

Many existing refrigeration systems are currently adapted for use in connection with existing refrigerants, and the compositions of the present invention are believed to be adaptable for use in many of such systems, either with or without system modification. In many applications the compositions of the present invention may provide an advantage as a replacement in systems, which are currently based on refrigerants having a relatively high capacity. Furthermore, in embodiments where it is desired to use a lower capacity refrigerant composition of the present invention, for reasons of cost for example, to replace a refrigerant of higher capacity, such embodiments of the present compositions provide a potential advantage. Thus, it is preferred in certain embodiments to use compositions of the present invention, particularly compositions comprising a substantial proportion of, and in some embodiments consisting essentially of 1233zd(E), as a replacement for existing refrigerants, such as R-11 and R-123. In certain applications, the refrigerants of the present invention potentially permit the beneficial use of larger displacement compressors, thereby resulting in better energy efficiency than other refrigerants, such as R-134a. Therefore the refrigerant compositions comprising 1233zd(E), provide the possibility of achieving a competitive advantage on an energy basis for refrigerant replacement applications.

It is contemplated that the compositions comprising 1233zd(E) also have advantage (either in original systems or when used as a replacement for refrigerants such as R-12 and R-500), in chillers typically used in connection with commercial air conditioning systems.

There is no need for a flammability suppressant since 1233zd(E) is nonflammable. Moreover, 1233zd(E) could be added as a flammability suppressant to chillers that use flammable refrigerants.

The present methods, systems and compositions are thus adaptable for use in connection with automotive air conditioning systems and devices, commercial refrigeration systems and devices, chillers, residential refrigerator and freezers, general air conditioning systems, heat pumps, and the like.

Thus, the compositions are used in numerous methods and systems, including in heat transfer fluids in methods and systems for transferring heat, such as refrigerants used in refrigeration, air conditioning and heat pump systems.

For example, the heat transfer methods generally comprise providing a composition of the present invention and causing heat to be transferred to or from the composition changing the phase of the composition. For example, the present methods provide cooling by absorbing heat from a fluid or article, preferably by evaporating the present refrigerant composition in the vicinity of the body or fluid to be cooled to produce vapor comprising the present composition. Preferably the methods include the further step of compressing the refrigerant vapor, usually with a compressor or similar equipment to produce vapor of the present composition at a relatively elevated pressure. Generally, the step of compressing the vapor results in the addition of heat to the vapor, causing an increase in the temperature of the relatively high-pressure vapor. Preferably, the present methods include removing from this relatively high temperature, high pressure vapor at least a portion of the heat added by the evaporation and compression steps. The heat removal step preferably includes condensing the high temperature, high-pressure vapor while the vapor is in a relatively high-pressure condition to produce a relatively high-pressure liquid comprising a composition of the present invention. This relatively high-pressure liquid preferably then undergoes a nominally isoenthalpic reduction in pressure to produce a relatively low temperature, low-pressure liquid. In such embodiments, it is this reduced temperature refrigerant liquid which is then vaporized by heat transferred from the body or fluid to be cooled.

In another process embodiment of the invention, the compositions of the invention may be used in a method for producing heating which comprises condensing a refrigerant comprising the compositions in the vicinity of a liquid or body to be heated. Such methods, as mentioned hereinbefore, frequently are reverse cycles to the refrigeration cycle described above.

For purposes of the invention, by centrifugal chillers is meant refrigeration equipment that uses centrifugal compression to convert the refrigerant gas from low to high pressure. Compression may be performed in a single stage or multiple stages. Preferably the multi-stage operation of the process comprises from about two to about five, more preferably about two to about four and most preferably about two to about three stages of compression. The precise number of stages is application dependent and can be determined without undue experimentation.

The 1233zd(E) compositions of the invention may be used in a method for producing refrigeration that comprises condensing a refrigerant and thereafter evaporating the refrigerant in the vicinity of a body to be cooled. Alternatively, the 1233zd(E) compositions of the invention may be used in a method for producing heating which comprises condensing a refrigerant in the vicinity of a body to be heated and thereafter evaporating the refrigerant.

In yet another embodiment, the 1233zd(E) compositions of the invention may be used in a method for producing refrigeration using a centrifugal chiller that comprises compressing the compound or mixture of the invention by centrifugal compression and evaporating the refrigerant in the vicinity of a body to be cooled.

The following examples are provided for the purpose of illustrating the present invention but without limiting the scope thereof.

Example 1

The vapor pressure of 1233zd(E) was measured by means of a MKS heated pressure transducer.

| Temp, C. | VP, psia |
|---|---|
| −10.06 | 4.33 |
| −0.05 | 6.9 |
| 9.93 | 10.55 |
| 19.93 | 15.45 |
| 29.86 | 22.06 |
| 39.78 | 20.47 |
| 49.85 | 40.92 |
| 59.78 | 55.5 |
| 69.77 | 72.85 |
| 79.69 | 93.02 |

The liquid density of 1233zd(E) was measured using a vibrating tube densitometer.

| Temp, C. | Den, kg/m$^3$ |
|---|---|
| −17.49 | 1360.3 |
| −29.45 | 1383.98 |
| −29.81 | 1384.70 |
| −25.08 | 1371.38 |
| −22.03 | 1367.40 |
| −19.59 | 1362.51 |
| −9.79 | 1341.34 |
| −1.99 | 1323.65 |
| 0.02 | 1319.65 |
| 10.11 | 1296.48 |
| 17.01 | 1280.22 |
| 18.83 | 1276.01 |
| 20.06 | 1276.37 |

Example 2

The fluid of choice for centrifugal chillers is 2,2-dichloro-1,1,1-trifluoroethane (R123). Due to the ozone depletion potential of R123 it is currently banned under the Montreal protocol. It is important to maintain the high coefficient of performance (COP) when finding a replacement fluid for R123. A single stage chiller consists if a compressor which pressurizes a low pressure gas and delivers it to the evaporator. The high pressure fluid is then condensed at a relatively high temperature, for this case the condenser is maintained at 40° C. The condensed fluid is then passed through an expansion device which lowers both the temperature and pressure of the fluid and is introduced into the evaporator; in this case the evaporator is maintained at 2° C. The cold low pressure gas is then used to transfer heat away from the body which requires cooling by evaporating the fluid in the evaporator. The thermodynamic performance of a refrigerant can be calculated using standard refrigerant cycle analysis techniques outlined in thermodynamic texts such as R. C. Downing, Fluorocarbon Refrigerants Handbook, Chapter 3, Prentice-Hall. 1988. The COP of a single compressor chiller was determined at a condenser temperature of 2° C., evaporator temperature of 40° C., and a compressor efficiency of 0.75. The COPs of R123, 1233zd(Z) and 1233zd(E) in a single compressor system are given in the following table. This example demonstrates that the COP of R123 can be maintained when using 1233zd(E) and 1233zd(Z). Surprisingly it has also been shown that for the same sized system 1233zd(E) has a much higher capacity that R123.

| Single Compressor | | |
|---|---|---|
| Fluid | Cap kJ/m³ | COP |
| R123 | 346.9 | 4.75 |
| 1233zd(E) | 471.8 | 4.73 |
| 1233zd(Z) | 223.1 | 4.82 |

Example 3

In order the raise the efficiency of a chiller a common practice is to use multiple compressors with an internal heat exchanger. This system is very similar to the one described in example 1 with the exception that a portion of the fluid exiting the condenser is used to cool the stream exiting the compressor at an intermediate pressure. The recombined stream is then compressed to the desired high pressure and introduced into the condenser. The thermodynamic performance of a refrigerant can be calculated using standard refrigerant cycle analysis techniques outlined in thermodynamic texts such as R. C. Downing, Fluorocarbon Refrigerants Handbook, Chapter 3, Prentice-Hall, 1988. The COP of a double compressor chiller was determined at a condenser temperature of 2° C., evaporator temperature of 40° C., both compressors had an efficiency of 0.75, and a 5° C. approach temperature out of the heat exchanger. The COPs of R123, 1233zd(Z) and 1233zd(E) in a double compressor system are given in the following table. Surprisingly it has also been shown that for the same sized system 1233zd(E) has a much higher capacity that R123.

| Double Compressor | | |
|---|---|---|
| Fluid | Cap kJ/m³ | COP |
| R123 | 385.1 | 4.96 |
| 1233zd(E) | 525.1 | 4.94 |
| 1233zd(Z) | 245.1 | 5.00 |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for producing refrigeration comprising compressing a refrigerant composition comprising 1233zd, wherein said compressing occurs within a centrifugal chiller system.

2. The method of claim 1 wherein the refrigerant composition comprises at least 50 wt % 1233zd(E) based on total weight of the composition.

3. The method of claim 1 wherein the refrigerant composition comprises at least 70 wt % 1233zd(E) based on total weight of the composition.

4. The method of claim 1 wherein said 1233zd comprises 1233zd(E).

5. A method for producing refrigeration comprising compressing a refrigerant comprising at least 50 wt % of 1233zd (E) in a chiller and thereafter evaporating the refrigerant in the vicinity of a body to be cooled.

6. The method of claim 5 wherein said refrigerant consists essentially of 1233zd(E).

7. A centrifugal chiller system comprising:
   a. a centrifugal compressor; and
   b. a refrigerant comprising 1233zd, wherein said refrigerant is disposed within said centrifugal compressor.

8. The centrifugal chiller system of claim 7 wherein the refrigerant composition comprises at least 50 wt % 1233zd (E) based on total weight of the composition.

9. The centrifugal chiller system of claim 7 wherein the refrigerant composition comprises at least 70 wt % 1233zd (E) based on total weight of the composition.

10. The centrifugal chiller system of claim 7 wherein said 1233zd comprises 1233zd(E).

11. The centrifugal chiller system of claim 7 wherein said refrigerant consists essentially of 1233zd(E).

* * * * *